US008194189B2

(12) United States Patent
Chan et al.

(10) Patent No.: US 8,194,189 B2
(45) Date of Patent: Jun. 5, 2012

(54) METHOD AND DEVICE FOR PROTECTING DISPLAYS FROM BURN-IN EFFECT

(75) Inventors: Choon Meng Chan, Singapore (SG); Hin Soon Choo, Singapore (SG); Gim Siong Tan, Singapore (SG)

(73) Assignee: Thomson Licensing, Issy-les-Moulineaux (FR)

( * ) Notice: Subject to any disclaimer, the term of this patent is extended or adjusted under 35 U.S.C. 154(b) by 1495 days.

(21) Appl. No.: 11/327,041

(22) Filed: Jan. 6, 2006

(65) Prior Publication Data

US 2007/0171311 A1 Jul. 26, 2007

(51) Int. Cl.
*H04N 9/64* (2006.01)

(52) U.S. Cl. ........................................ 348/701

(58) Field of Classification Search ............. 348/240.12, 348/701, 615, 173, 607, 700, 725; 345/60, 345/83; 324/770; 375/285, 346
See application file for complete search history.

(56) References Cited

U.S. PATENT DOCUMENTS

| | | | | |
|---|---|---|---|---|
| 6,384,816 | B1 * | 5/2002 | Tabata | 345/204 |
| 6,407,726 | B1 * | 6/2002 | Endo et al. | 345/87 |
| 7,432,931 | B2 * | 10/2008 | Someya et al. | 345/475 |
| 7,525,514 | B2 * | 4/2009 | Ohno | 345/60 |
| 2004/0165064 | A1 * | 8/2004 | Weitbruch et al. | 348/173 |
| 2005/0018046 | A1 * | 1/2005 | Tsuzuki | 348/173 |
| 2005/0212726 | A1 * | 9/2005 | Namba et al. | 345/63 |
| 2007/0096767 | A1 * | 5/2007 | Tsai | 324/770 |
| 2007/0127569 | A1 * | 6/2007 | Hatalkar | 375/240.12 |

FOREIGN PATENT DOCUMENTS

| | | | |
|---|---|---|---|
| EP | 1679682 | A1 * | 7/2006 |
| EP | 1679683 | A1 * | 7/2006 |
| JP | 2000-227775 | | 8/2000 |
| JP | 2003-131647 | | 9/2003 |
| KR | 1020040037369 | * | 5/2004 |

OTHER PUBLICATIONS

Patent Abstract of Japan patent 10-020838, Jan. 23, 1998, Mitsubishi Electric Corp.
Patent Abstract of Japan 2000-227775; Aug. 15, 2000; NEC Corp.
Search Report dated May 10, 2005.

* cited by examiner

*Primary Examiner* — Tesfaldet Bocure
(74) *Attorney, Agent, or Firm* — Myers Wolin, LLC

(57) ABSTRACT

The invention concerns a device and a method for protecting display time. The image processing method according to the invention comprises a step of shifting pictures by a pattern at a pixel shift frequency characterized in that the frequency is changed for a group of at least one picture depending on a motion degree of the group.

5 Claims, 3 Drawing Sheets

METHOD AND DEVICE FOR PROTECTING DISPLAYS FROM BURN-IN EFFECT

1. FIELD OF THE INVENTION

The invention concerns a device and a method for protecting display panels from burn-in effect when displaying a still picture over a long period of time.

2. BACKGROUND OF THE INVENTION

The burn-in problem can be divided in a short-term burn-in and a long-term burn-in. On a plasma display panel (PDP), two kinds of ghost images are existing:

in "short term burn-in": the ghost image (3 to 5% of its original brightness) is mainly a positive image (i.e. "burned" cells are brighter than others) which disappear after a short time (some minutes up to some hours). The origin is not completely clear yet but it seems that this effect is related to some kind of charges which have been accumulated during the time a cell stays ON. Later these charges increase the luminance emitted by the cell even if a priming is done in the frame period.

in "long term burn-in": the stable sticking image is a negative image (i.e. "burned" cells are darker than others) related to a kind of aging of the plasma cell. The cumulative amplitude can go up to 50% loss of luminance. The long term burn-in is the more critical issue since this effect is not reversible and could reach 50% luminance loss. At the beginning of the PDP lifetime, the aging process is quite strong and leads quickly to create disturbing ghost images, above all for professional applications using static pictures. Later this process decreases.

In the case of cathode ray tube (CRT) technology, especially for personal computer (PC) monitors, this effect is really an issue, that is why they dispose today of a screen saver in order to prevent a strong marking of the screen. One approach to long-term burn-in protection is to invert the static pictures in order to burn the entire PDP panel in the same way. This requires to know the picture content and this method is strongly limited by power consumption of the panel. Another approach is to use a kind of jittering in picture position on professional PDPS. Thereby the picture is regularly translated a bit in all directions. Nowadays, the flat display panels are often protected from burn-in effect by shifting the picture in a certain manner (hereinafter defined as a pattern) as defined by the manufacturer. A known solution to reduce burn-in effect is to shift pictures constantly (e.g. 4 pixels left, 4 pixels up, 4 pixels right, 4 pixels down, and so on). One disadvantage is that this shifting of the picture is visible to the user and thus may be annoying.

3. SUMMARY OF THE INVENTION

The invention aims at reducing visual irritations due to burn-in protection shifting.

The invention concerns a method of image processing in a picture display device comprising a step of shifting pictures by a pattern at a pixel shift frequency. The frequency is changed for a group of at least one picture depending on a motion degree of the group.

Advantageously, the pixel shift frequency value is inversely proportional to said motion degree.

According to a particular embodiment, the method comprises the following steps:

associating a pixel shift frequency to each motion degree;

computing a motion degree for a group of at least one picture; and selecting the pixel shift frequency associated to the computed motion degree.

According to another embodiment, the method comprises the following steps:

defining K motion ranges (40);

associating a pixel shift frequency to each motion range (40);

computing a motion degree for a group of at least one image (41);

selecting the motion range including the computed motion degree (43); and changing pixel shift frequency with the pixel shift frequency associated to said selected motion range (45).

Preferentially, the pixel shift frequency is changed only if at least T consecutive computed motion degrees belong to the same motion range.

According to a particular embodiment, the motion degree is computed by the following steps:

collecting n motion data samples relating to m pictures, m<=n; and averaging said n samples to get a motion data average for said m pictures.

Advantageously, the pixel shift pattern consists in shifting the whole picture p pixels diagonally downwards up to a maximum of Q pixels and then shifting it p pixels upwards or inversely, p>=1 and Q being a multiple of p.

The invention further concerns a picture processing apparatus that comprises motion processing means for computing a motion degree and image processing means for shifting pictures by a pattern at a pixel shift frequency. The frequency is changed for a group of at least one picture depending on the motion degree of the group.

Preferentially, picture processing apparatus according to an embodiment of the invention, characterized in that a look-up table is used to associate a pixel shift frequency to a motion degree.

4. BRIEF DESCRIPTION OF THE DRAWINGS

Other features and advantages of the invention will appear with the following description of some of its embodiments, this description being made in connection with the drawings in which.

5. DESCRIPTION OF PREFERRED EMBODIMENTS

In current burn-in protection device, pixel shifts are applied in the same manner to both still and moving pictures, i.e. shifts take place after a fix interval of time regardless of the currently displayed picture content.

The method according to the invention consists in making the pixel shift frequency dependent on the picture content. More particularly, it consists in making the pixel shift frequency dependent on the motion degree of current pictures. The pixel shift frequency in this particular context means how frequently the pixels are shifted in a specific pattern over time. A high pixel shift frequency means that the time to repeat the pixel shift action is very short whereas a low pixel shift frequency means that the time to repeat the pixel shift action is very long. Today's integrated circuit (IC) devoted to video signal processing often includes a motion detection block providing motion data (e.g. motion compensation information). According to the invention, it is proposed to detect a motion degree within current pictures for example by using motion information provided by the digital video processing IC (more particularly the motion detection block of the IC) and to adapt the shift pattern frequency in accordance with it. The motion detection block is providing motion data (referenced as $MD_x$ hereinafter) for each picture. This motion data is either relating to a part of the picture (at pixel or block level) or to the whole picture (e.g. the result of collecting and processing the individual pixel's motion vectors of this picture). These motion data are available through register reading and can be used by the method according to the invention. Thus instead of applying a fix pattern across a set of pictures at a constant pixel shift frequency, the pattern is applied at a variable frequency depending on the motion degree of pictures. If there is high movement in the pictures, then no additional shift is necessary. In case there is only slight or no movement, shift action is performed at a higher frequency. This is particularly suitable to series of pictures where there is no movement at all for a long time (e.g. because the user has paused a playback from DVD, or because program has stopped and just test pattern is broadcast).

Figure 1:
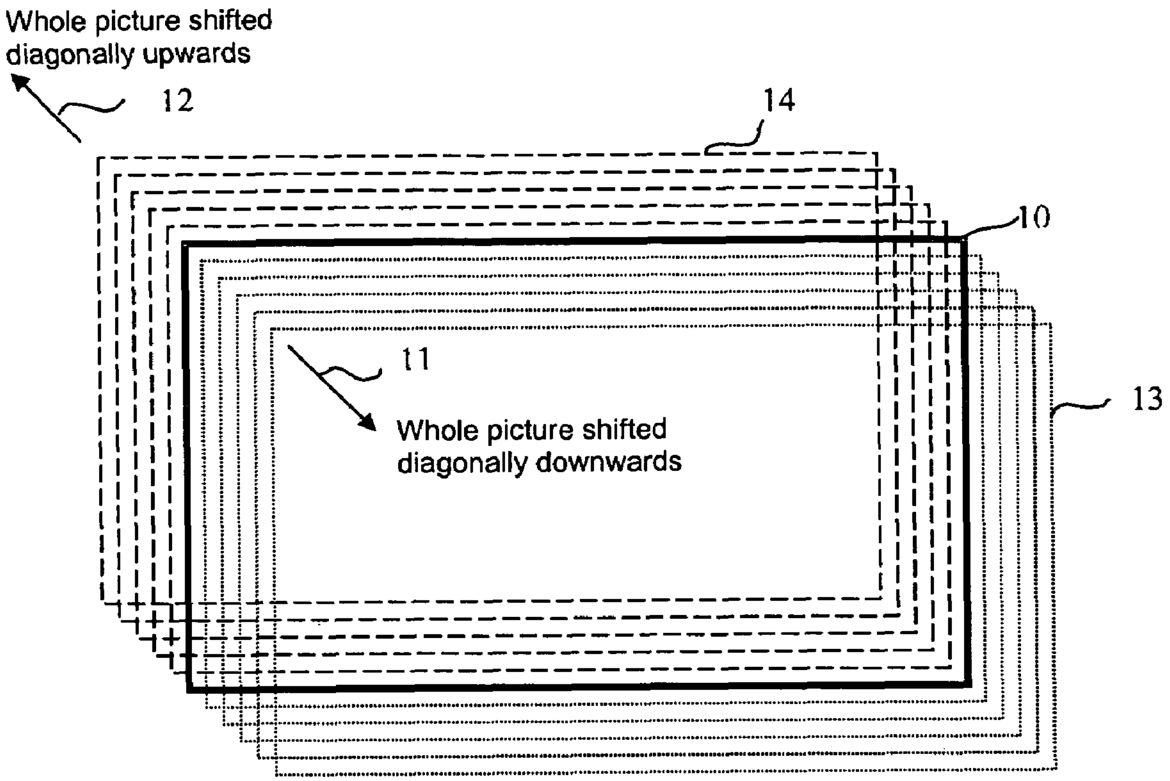
FIG. 1 depicts an example of a pixel shift pattern where the whole picture is shifted either diagonally downwards or diagonally upwards.

FIG. 1 depicts an example of a shift pattern. The picture original position is represented with a solid line referenced as 10, while shifted positions are represented with dotted lines. From its original position, the picture can be shifted in each direction diagonally downwards (arrow 11) or diagonally upwards (arrow 12). According to the invention, it is suggested to fix a limit in either direction on the maximum number of pixel shifts allowed apart from the original picture position 10. On FIG. 1, the limit shifted positions are referenced as 13 and 14. These two limit positions represent respectively a shift of five pixels in the diagonal downwards position and a shift of five pixels in the diagonal upwards position. The value of the maximum number of pixel shifts allowed can be adapted based on the application. The pixel shift pattern is thus defined as follows: shift the whole picture one pixel diagonally downwards up to a maximum of five pixels apart from the original position (position 13) and then shift it upwards up to a maximum of five pixels apart from the original position (position 14).

Figure 2:
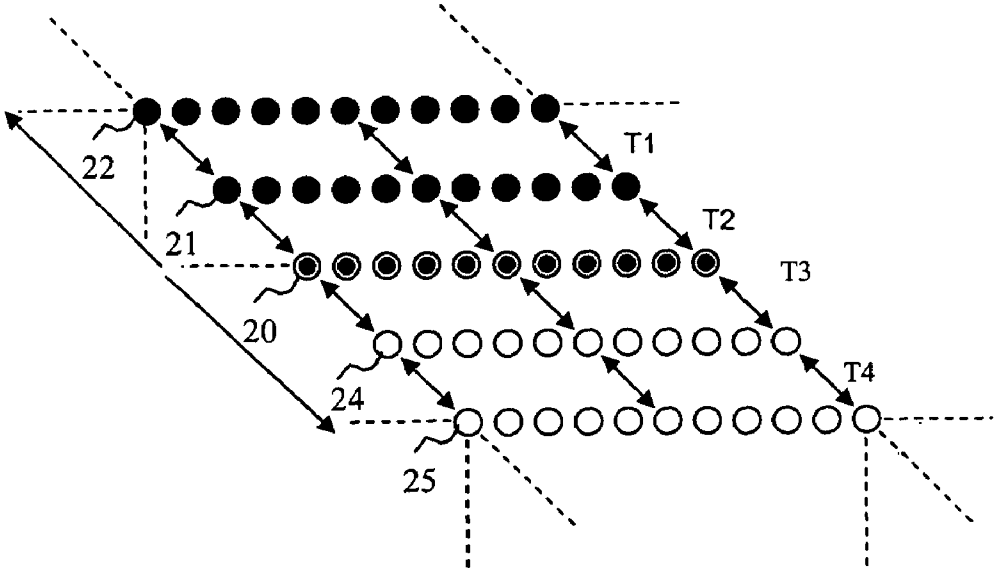
FIG. 2 depicts the shifting of lines of pixels according to the pixel shift pattern of FIG. 1.

FIG. 2 depicts the same shift pattern example. Each circle represents a pixel. The gray pixels 20 belong to the picture at the original position. The black pixels 21 and 22 belong to pictures shifted diagonally upwards by one or two pixels from the original position respectively. The white pixels 24 and 25 belong to pictures shifted diagonally downwards by one or two pixels from the original position respectively. T1, T2, T3, and T4 represent the time between pixel shifts. In a conventional burn-in protection device, the time between pixel shift is constant. Referring to FIG. 2, this means that T1=T2=T3=T4. The present invention consists in making T1, T2, T3, and T4 of different values, said values depending on pictures motion content.

According to the invention, a motion degree can be computed for example by a motion detection block of the display device. The motion detection block thus averages over n samples (n>=1) of motion data $MD_x$ to give a motion data average referenced as $MD_{ave}$ hereinafter. On the one hand, if the motion data $MD_x$ is related to a whole picture, then one sample refers to one picture. In this case, $MD_{ave}$ is obtained by averaging $MD_x$ over n pictures which are not necessarily consecutive pictures. On the other hand, if the motion data $MD_x$ is related to a part of the picture, then several samples refer to the same picture. In this case, $MD_{ave}$ is obtained by averaging $MD_x$ over m pictures with m<=n. The motion data average $MD_{ave}$ can also be computed in another block than the motion detection block of the display device. This block thus collects the n samples of motion data $MD_x$ from the motion detection block. In this particular case, the system is periodically reading the motion data provided by the motion detection block. If the motion detection block outputs a single $MD_x$ value per picture (i.e. a global motion data), the period at which the $MD_x$ values are read can be set at a value which is an integer multiple of frame duration (i.e. a multiple of 20 ms for 50 Hz system and 16.67 ms for 60 Hz system). The number n of samples used for calculating the average value $MD_{ave}$ is variable and is application dependent. The number of five samples seems to be well adapted to PDP for TVs. The bigger the sample size n, the more accurate the motion data average value is. However it should not be too large otherwise it loses its meaning. This motion data average gives a rough idea of the motion content, i.e. of motion degree, of current pictures. This motion data average can be used as it is. In this case, a pixel shift frequency is associated to each motion degree, i.e. motion data average value. Thus each time a new motion data average is computed, a new pixel shift frequency is selected. The selected pixel shift frequency is inversely proportional to the motion data average.

Figure 3:
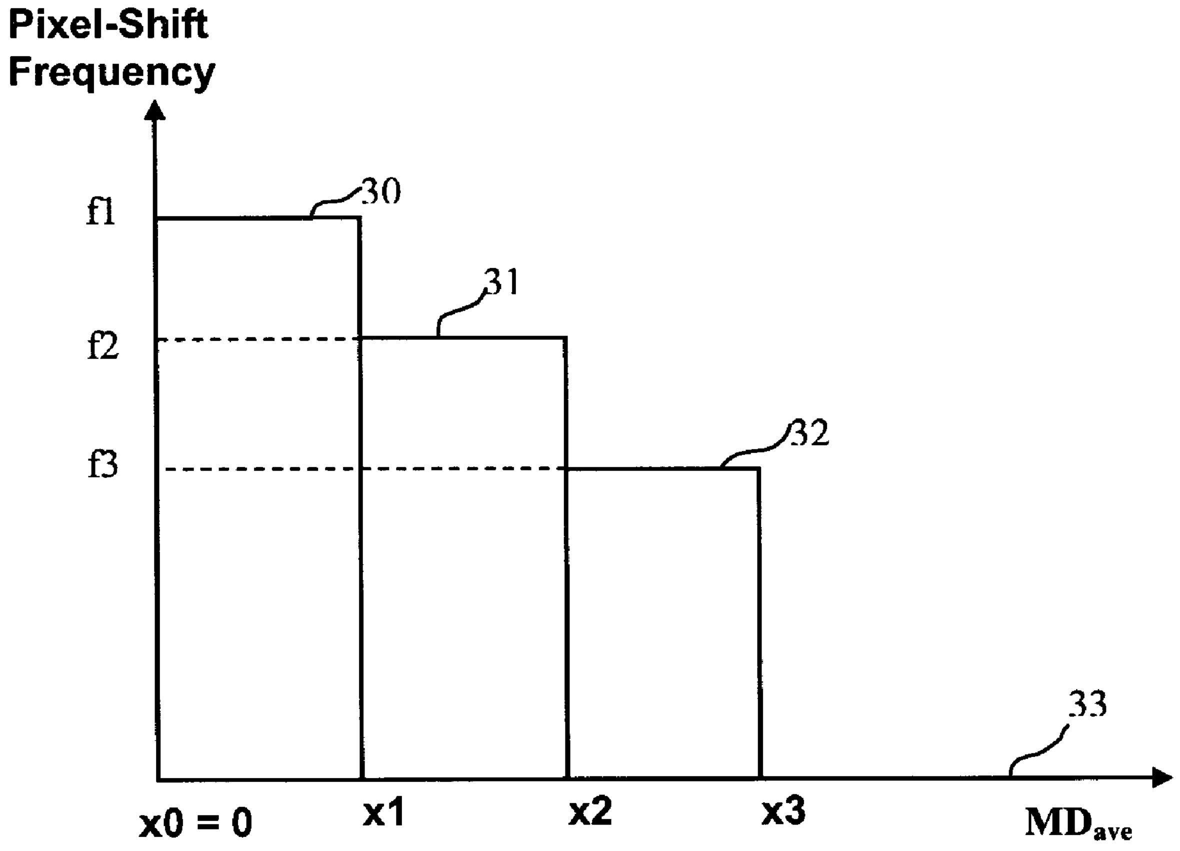
FIG. 3 depicts a diagram representing the pixel shift-frequency as a function of the motion data average.

Preferentially, several motion ranges are defined. Each range characterizes a type of motion content (referenced as a range motion degree hereinafter) and is defined by its upper and lower bounds. A pixel shift frequency is associated to each range in such a way that pixel shift frequency value is inversely proportional to the range motion degree. A look-up table can be used to associate the pixel shift frequency to the motion range. FIG. 3 depicts a case where 4 motion ranges 30, 31, 32 and 33 are defined. Each range is defined by its bounds: x0 and x1 for range 30, x1 and x2 for range 31, x2 and x3 for range 32 and x3 and the infinity for range 33. The four ranges are characterized as follows:

- Range 30: if $MD_{ave}$ is comprised between x0=0 and x1, x1 being including, then pictures are classified as low motion pictures and pixel shift frequency is set to f1.
- Range 31: If $MD_{ave}$ is comprised between x1 and x2, x1 being excluded and x2 being included, then pictures are classified as medium motion pictures and pixel shift frequency is set to f2.
- Range 32: If $MD_{ave}$ is comprised between x2 and x3, x2 being excluded and x3 being included, then pictures are classified as high motion pictures and pixel shift frequency is set to f3.
- Range 33: If $MD_{ave}$ is strictly higher than x3 then pictures are classified as very large motion pictures and pixel shift frequency is set to zero.

The number of motion ranges defined is application dependent. The higher the number of ranges, the finer the difference in pixel shift frequency is. The number of four motion ranges seems to be well adapted to PDP for TVs. For the same application, 1/f1 can be set to 30 s, 1/f2 can be set to 60 s, and 1/f3 can be set to 90 s.

Figure 4:
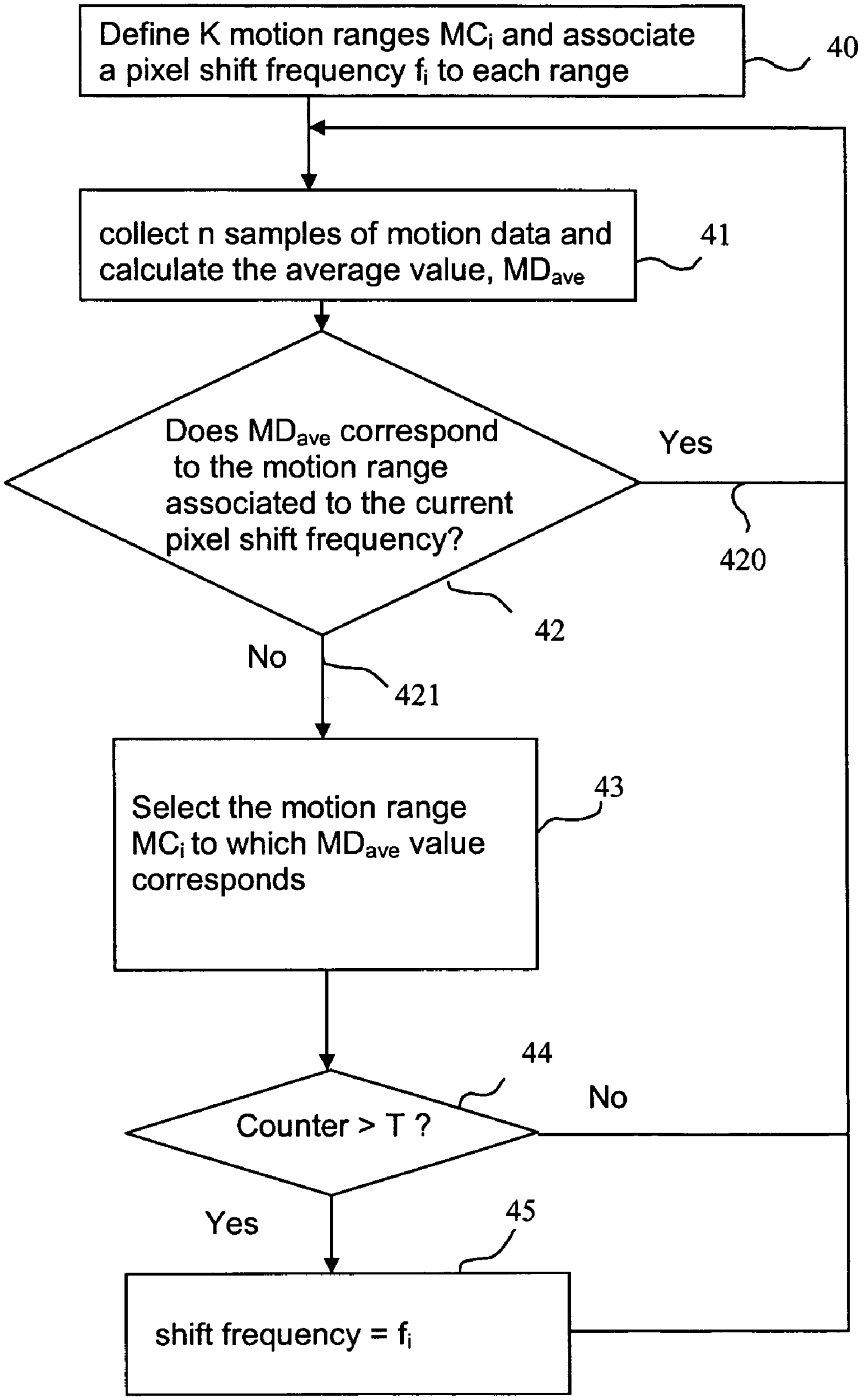
FIG. 4 depicts the flowchart of the method according to the invention.

FIG. 4 depicts the main steps of the method according to the invention. The first step 40 of the method consists in defining K motion ranges $MC_i$ (i<=K) and in associating a pixel shift frequency to each range as defined hereinabove.

The second step 41 consists in estimating motion data average $MD_{ave}$ by averaging n samples of motion data $MD_x$ computed for example by the motion detection block already available from the video processing IC.

At step 42, the new $MD_{ave}$ value is compared to the bounds (i.e. $x_i$) of the motion range associated to the current pixel shift frequency. If $MD_{ave}$ is comprised between these bounds (case 420) then there is no need to change pixel shift frequency. If it is not the case then the pixel shift frequency can be changed (case 421). This comparison step is not required and can be avoided.

At step 43, $MD_{ave}$ is further compared to ranges bounds to select the corresponding motion range $MC_i$.

Advantageously at step 44, to avoid changing pixel shift frequency too frequently, an hysteresis counter is used. It registers the number of consecutive $MD_{ave}$ values corresponding to the same motion range as defined on FIG. 3. If this counter does not exceed a threshold T then the pixel shift frequency is not changed. If this counter exceeds the threshold T then the pixel shift frequency is changed, at step 45, according to the pixel shift frequency associated to the motion range selected at step 43. The counter is reset each time the new motion data average corresponds to a different motion range from that of the motion data average estimated just previously. For example, if T=4, then if motion range selected at time n corresponds to motion range 30 (i.e. current pixel shift frequency is f1), and if $MD_{ave}$ value calculated at time (n+1) corresponds to motion range 31, and if $MD_{ave}$ value calculated at time (n+2) corresponds to motion range 31, but if $MD_{ave}$ value calculated at time (n+3) corresponds to motion range 32, then counter is reset and pixel shift frequency is not changed to f2 (i.e. it remains f1). On the other hand, if $MD_{ave}$ values calculated at time (n+1), (n+2), (n+3), and (n+4) correspond to motion range 31, then the pixel shift frequency is changed from f1 to f2 since 4 consecutive $MD_{ave}$ values correspond to the same motion range, i.e. motion range 31. The threshold value 4 seems to be well adapted to PDP for TVs.

This solution can be extended to any kind of display panels that suffers from burn-in effect due to static pictures. This could be, for example, extended to CRT device. The invention is described with four motion ranges but can be extended to any number of ranges if required by the application. The shift pattern can also be adapted to the application. The invention is described with a diagonal shift pattern but can be extended to any kind of patterns (e.g. 4 pixels left, 4 pixels up, 4 pixels right, 4 pixels down).

The invention claimed is:

1. Method of image processing for burn-in protection in a picture display device, comprising shifting pictures by a pixel shift pattern at a pixel shift frequency; wherein said frequency is dynamically adjusted for a group of at least one picture depending on motion data of said group and the pixel shift frequency value is inversely proportional to said motion data.

2. The method according to claim 1, wherein said motion data is computed by:

collecting n motion data samples relating to m pictures, m<=n; and averaging said n samples to get a motion data average for said m pictures.

3. The method according to claim 1, wherein the method comprises:

defining K motion ranges;

associating a pixel shift frequency to each motion range;

computing a motion data for a group of at least one image;

selecting the motion range including the computed motion data; and changing pixel shift frequency with the pixel shift frequency associated to said selected motion range.

4. The method according to claim 3, wherein the pixel shift frequency is changed only if at least T consecutive computed motion data belong to the same motion range.

5. The method according to claim 4, wherein said motion data is computed by:

collecting n motion data samples relating to m pictures, m<=n; and averaging said n samples to get a motion data average for said m pictures.

* * * * *